United States Patent [19]

Blanton, Jr.

[11] 4,066,573
[45] Jan. 3, 1978

[54] EMERALD GREEN ALUMINA

[75] Inventor: William A. Blanton, Jr., San Anselmo, Calif.

[73] Assignee: Chevron Research Company, San Francisco, Calif.

[21] Appl. No.: 726,365

[22] Filed: Sept. 24, 1976

[51] Int. Cl.$^2$ .................... B01J 27/02; B01J 21/00; C01B 17/04

[52] U.S. Cl. .................... 252/439; 252/463; 423/576

[58] Field of Search ............... 252/439, 463; 423/576

[56] References Cited

U.S. PATENT DOCUMENTS

| 2,092,386 | 9/1937 | Baehr et al. | 423/576 |
|---|---|---|---|
| 2,767,062 | 10/1956 | Duecker | 423/576 |

OTHER PUBLICATIONS

Hydrocarbon Processing, Nov. 1974, pp. 181–186, "Choose Catalyst Objectively," Burns et al.
Kaiser Aluminum and Chemical Corporation, Center for Technology, Oct. 1972, M. J. Pearson, "Catalysts for Claus Process," page 46.

Primary Examiner—Patrick P. Garvin
Assistant Examiner—William G. Wright
Attorney, Agent, or Firm—D. A. Newell; R. H. Davies; D. L. Hagmann

[57] ABSTRACT

A process is provided for preparing catalytically active emerald green colored alumina by contacting colorless alumina with carbonyl sulfide. This material catalyzes the reduction of sulfur dioxide by carbon monoxide.

6 Claims, No Drawings

EMERALD GREEN ALUMINA

BACKGROUND OF THE INVENTION

This invention relates to (1) a process for preparing emerald green alumina, (2) the green alumina composition and (3) to using this green alumina as a catalyst in a process for the reduction of sulfur dioxide by carbon monoxide.

SUMMARY OF THE INVENTION

A method is provided for producing a novel emerald green alumina composition by contacting colorless alumina with carbonyl sulfide at an elevated temperature, particularly an elevated temperature of about 200°–900° C, preferably 250°–750° C, and more preferably 350°–600° C, with particularly good results being obtained at about 440° C, the contacting being for a period sufficient to produce said color, for example, in the range of from about 1 to 48 hours.

A method is also provided for reducing sulfur dioxide with carbon monoxide by contacting a mixture thereof, for example, flue gas, with the aforementioned green alumina at an elevated temperature in the range of about 200° to 700° C, preferably 250° C, to 600° C, and more preferably 275° C to 400° C, with particularly good results being obtained at about 300° C.

The following examples further illustrate the invention. They are not intended to limit its scope.

EXAMPLE 1

Colorless alumina was contacted with a gaseous mixture of 2000 ppmw of carbonyl sulfide in nitrogen gas. The contacting was effected at about 440° C at a total flow rate of 349 cc per minute (STP) for a period of about 3 hours. The resulting alumina was colored dark emerald green.

EXAMPLE 2

Green alumina prepared as in Example 1 was used as a contact catalyst for a mixture containing about 2000 ppmw of sulfur dioxide and about 6000 ppmw of carbon monoxide. At a contact temperature of about 300° C and a flow rate of about 425 cc/min (STP), the reduction of the sulfur dioxide to sulfur and carbonyl sulfide was at least 90 percent complete.

EXAMPLE 3

Example 2 was repeated except that colorless alumina was used as the contacting material. Little or no reduction of sulfur dioxide occurred.

What is claimed is:

1. A method for preparing dark emerald green colored alumina, comprising contacting white alumina with a contact material consisting essentially of carbonyl sulfide at an elevated temperature in the range of from about 200°–900° C and for a period sufficient to produce said color.

2. The composition produced by the method of claim 1.

3. A method as in claim 1 wherein said temperature is in the range of from about 250°–750° C.

4. A method as in claim 1 wherein said temperature is in the range of from about 350°–600° C.

5. A method for preparing dark emerald green colored alumina, comprising contacting white alumina with a contact material consisting essentially of carbonyl sulfide, said contacting being at a temperature of about 440° C for a period of about 3 hours.

6. The composition produced by the method of claim 5.

* * * * *